United States Patent
Kim et al.

(10) Patent No.: US 12,328,508 B2
(45) Date of Patent: Jun. 10, 2025

(54) METHOD FOR TRACKING OBJECT BY CONTROLLING A ROTATION OF A CRADLE USING A PORTABLE TERMINAL AND SYSTEM THEREOF

(71) Applicant: 3I INC., Daegu (KR)

(72) Inventors: Ken Kim, Seoul (KR); Ji Wuck Jung, Goyang-si (KR)

(73) Assignee: 3I INC., Daegu (KR)

( * ) Notice: Subject to any disclaimer, the term of this patent is extended or adjusted under 35 U.S.C. 154(b) by 100 days.

(21) Appl. No.: 18/212,530

(22) Filed: Jun. 21, 2023

(65) Prior Publication Data

US 2024/0007751 A1 Jan. 4, 2024

Related U.S. Application Data

(63) Continuation of application No. PCT/KR2022/018933, filed on Nov. 28, 2022.

(30) Foreign Application Priority Data

Jun. 29, 2022 (KR) .......... 10-2022-0080010
Nov. 28, 2022 (KR) .......... 10-2022-0161141

(51) Int. Cl.
*H04N 23/695* (2023.01)
*G06T 7/20* (2017.01)
*H04N 23/61* (2023.01)

(52) U.S. Cl.
CPC ............ *H04N 23/695* (2023.01); *G06T 7/20* (2013.01); *H04N 23/61* (2023.01)

(58) Field of Classification Search
None
See application file for complete search history.

(56) References Cited

U.S. PATENT DOCUMENTS

| 6,236,682 | B1 * | 5/2001 | Ota ............ H04N 19/537 |
| | | | 375/E7.106 |
| 9,922,262 | B2 * | 3/2018 | Lim ............ G06T 7/246 |
| 10,244,150 | B2 | 3/2019 | Son |
| 2016/0171301 | A1 | 6/2016 | Lim et al. |
| 2016/0316123 | A1 * | 10/2016 | Wakamatsu ...... G06T 7/246 |

(Continued)

FOREIGN PATENT DOCUMENTS

| JP | 2009-159356 A | 7/2009 |
| JP | 5024033 B2 | 9/2012 |

(Continued)

*Primary Examiner* — Edemio Navas, Jr.
(74) *Attorney, Agent, or Firm* — NSIP Law

(57) ABSTRACT

A method of tracking an object performed in a portable terminal linked with a rotatable cradle so that a rotation of the rotatable cradle is controlled to track the object, and the method includes receiving frame images captured in a forward direction at a preset frame rate, and detecting whether an object exists in the frame image for each of the frame images, when the object is detected in the frame image for each of the frame images, calculating a reference distance in association with a position of the detected object in the frame image, calculating a rotational speed of the rotatable cradle for a first frame image based on accumulation of reference distances of a plurality of frame images included in a frame group including the first frame image, and controlling driving of the rotatable cradle based on the rotational speed.

13 Claims, 13 Drawing Sheets

(56) References Cited

U.S. PATENT DOCUMENTS

2017/0155805 A1 6/2017 Son
2019/0168870 A1* 6/2019 Li .................... G05D 1/0094
2023/0083059 A1* 3/2023 Lemmer ............ G01N 23/04
378/62

FOREIGN PATENT DOCUMENTS

| KR | 10-1631955 B1 | 6/2016 |
| KR | 10-2017-0061438 A | 6/2017 |
| KR | 10-2017-0086392 A | 7/2017 |
| KR | 10-1850534 B1 | 4/2018 |
| KR | 10-2155895 B1 | 9/2020 |
| KR | 10-2021-0061229 A | 5/2021 |
| KR | 10-2021-0102143 A | 8/2021 |
| KR | 10-2021-0102144 A | 8/2021 |
| KR | 10-2326877 B1 | 11/2021 |
| KR | 10-2430211 B1 | 8/2022 |

\* cited by examiner

120

METHOD FOR TRACKING OBJECT BY CONTROLLING A ROTATION OF A CRADLE USING A PORTABLE TERMINAL AND SYSTEM THEREOF

CROSS-REFERENCE TO RELATED APPLICATIONS

Pursuant to 35 USC 120 and 365(c), this application is a continuation of International Application No. PCT/KR2022/018933 filed on Nov. 28, 2022, and claims the benefit under 35 USC 119(a) of Korean Application No. 10-2022-0080010 filed on Jun. 29, 2022 and Korean Patent Application No. 10-2022-0161141 filed on Nov. 28, 2022, in the Korean Intellectual Property Office, the disclosures of which are incorporated herein by reference.

BACKGROUND

1. Field

The present application relates to a method and system for tracking an object.

2. Description of the Related Art

In order to track an object desired by a user through a mechanical device including a camera, a plurality of cameras or an additional device capable of being linked with the mechanical device including the camera and rotating the mechanical device needs to be used.

However, tracking objects using a plurality of cameras is inconvenient in that the cameras need to be installed at various angles and directions, feature points are assigned to all objects captured by the cameras, and users need to designate desired objects.

In order to solve this inconvenience, inventions have been developed for a rotatable device capable of tracking an object designated by a user by allowing the rotatable device to be linked with a mechanical device including a camera even without using a plurality of cameras.

However, these devices have a problem in that it is difficult to accurately track moving objects whose speed is not constant, and the objects need to be detected again after the objects deviate from a screen of the camera.

SUMMARY

This Summary is provided to introduce a selection of concepts in a simplified form that is further described below in the Detailed Description. This Summary is not intended to identify key features or essential features of the claimed subject matter, nor is it intended to be used as an aid in determining the scope of the claimed subject matter.

One technical aspect of the present application is to solve the above problems of the related art, and an embodiment disclosed in the present application provides a method of objecting an object that is capable of controlling a rotational speed of a rotatable cradle to track an object regardless of whether an object is detected in a frame image.

Aspects of the present application are not limited to the above-described aspects. That is, other aspects that are not described may be obviously understood by those skilled in the art from the following specification.

An aspect of the present application provides a method of tracking an object. The method of tracking an object performed in a portable terminal linked with a rotatable cradle so that a rotation of the rotatable cradle is controlled to track the object, and the method includes receiving frame images captured in a forward direction at a preset frame rate, and detecting whether an object exists in the frame image for each of the frame images, when the object is detected in the frame image for each of the frame images, calculating a reference distance in association with a position of the detected object in the frame image, calculating a rotational speed of the rotatable cradle for a first frame image based on an accumulation of reference distances of a plurality of frame images included in a frame group including the first frame image, and controlling driving of the rotatable cradle based on the rotational speed.

Another aspect of the present application provides a system for tracking an object. The system for tracking an object may include a rotatable cradle provided with a portable terminal mounted thereon and configured to rotate according to a rotational speed provided from the portable terminal, and the portable terminal configured to control the rotatable cradle based on a position of the object within a frame image so that a front of the portable terminal tracks the object, in which the portable terminal may include an imaging unit configured to capture the frame images in a forward direction at a preset frame rate and a processor configured to detect whether the object exists in a corresponding frame image for each of the frame images and determining a rotational speed of the rotatable cradle based on the position of the detected object.

Still another technical aspect of the present invention provides a storage medium. A storage medium in which computer-readable instructions are stored, and, when executed by a computing device, the instructions may allow a computing device to execute the operation of receiving frame images captured in a forward direction at a preset frame rate, and detecting whether an object exists in the frame image for each of the frame images, when the object is detected in the frame image, calculating a reference distance in association with a position of the detected object in the frame image for each of the frame images; calculating a rotational speed of a rotatable cradle for a first frame image based on an accumulation of reference distances of a plurality of frame images included in a frame group including the first frame image; and controlling driving of the rotatable cradle based on the rotational speed.

The means for solving the above problems do not enumerate all the features of the present application. Various units for solving the problems of the present application may be understood in more detail with reference to specific embodiments of the following detailed description.

BRIEF DESCRIPTION OF THE DRAWINGS

These and/or other aspects of the disclosure will become apparent and more readily appreciated from the following description of the embodiments, taken in conjunction with the accompanying drawings of which.

Throughout the drawings and the detailed description, the same reference numerals may refer to the same, or like, elements. The drawings may not be to scale, and the relative size, proportions, and depiction of elements in the drawings may be exaggerated for clarity, illustration, and convenience.

DETAILED DESCRIPTION

Figure 1:
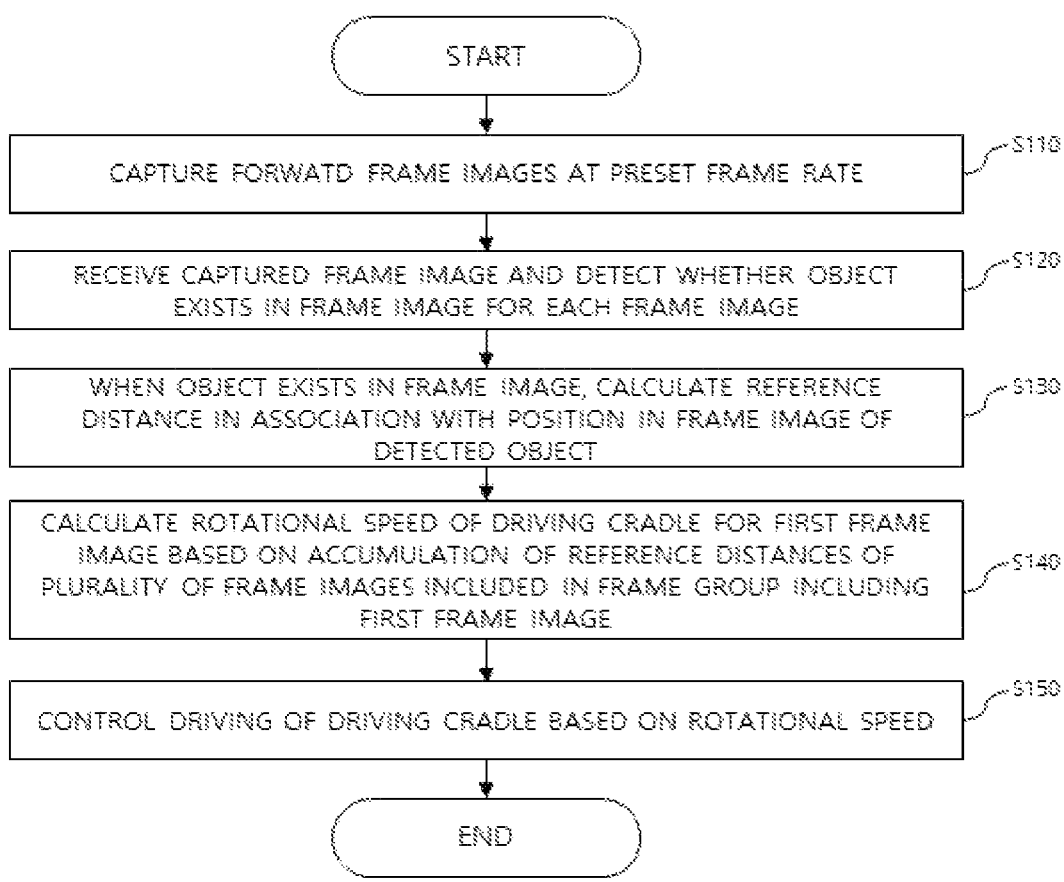
FIG. 1 is a diagram for describing a method of tracking an object according to an embodiment disclosed in the present application.

Hereinafter, exemplary embodiments of the present disclosure will be described with reference to the accompanying drawings.

However, embodiments of the present disclosure may be modified into many different forms and the scope of the present disclosure is limited to the embodiments set forth herein. Rather, these embodiments of the present disclosure are provided so that the present disclosure will completely describe the present disclosure to those skilled in the art.

Various embodiments of the present disclosure and terms used therein are not intended to limit the technical features described in the present disclosure to specific embodiments, and should be understood to include various changes, equivalents, or substitutes of the embodiments. Throughout the accompanying drawings, similar or related components will be denoted by similar reference numerals. A singular form of a noun corresponding to an item may include one or more of the item, unless the relevant context clearly dictates otherwise. In the present disclosure, each phrase such as "A or B," "at least one of A and B," "at least one of A or B," "A, B, or C," "at least one of A, B and C," and "at least one of A, B, or C" may include any one of items listed together in the corresponding one of those phrases, or all possible combinations thereof. Terms such as "first," "second," "1st," or "2nd" may simply be used to distinguish a component from another component, and do not limit the components in other respects (e.g., importance or order). When one (e.g., first) component is "coupled," "connected," or "joined" to another (e.g., second) component with or without the terms "functionally" or "communicatively," it means that the one component may be connected to another component directly or through a third component.

The term "module" used in the present disclosure refers to a unit that processes at least one function or operation, which may be implemented as software or a combination of hardware and software.

Various embodiments of the present disclosure may be implemented as software (for example, program) including one or more instructions stored in a storage medium readable by a machine (for example, user terminal or computing device). For example, a processor may call and execute at least one instruction among one or more instructions stored from the storage medium. This makes it possible for the device to be operated to perform at least one function according to the at least one instruction called. The one or more instructions may include codes generated by a compiler or codes executable by an interpreter. The machine-readable storage medium may be provided in the form of a non-transitory storage medium. Here, the "non-transitory" means that the storage medium is a tangible device, and does not include a signal (for example, electromagnetic waves), and the term does not distinguish between the case where data is stored semi-permanently on a storage medium and the case where data is temporarily stored thereon.

According to an embodiment, the methods according to various embodiments disclosed in the present document may be included and provided in a computer program product. The computer program product may be traded as a product between a seller and a purchaser. The computer program product may be distributed in the form of a machine-readable storage medium (for example, compact disc read only memory (CD-ROM)), or may be distributed (for example, download or upload) through an application store (for example, Play Store™) or may be directly distributed (for example, download or upload) between two user devices (for example, smartphones) online. In the case of the online distribution, at least a portion of the computer program product may be at least temporarily stored in a storage medium readable by a device such as a memory of a server of a manufacturer, a server of an application store, or a relay server or be temporarily generated.

According to various embodiments, each component (for example, module or program) of the above-described components may include one entity or a plurality of entities. According to various embodiments, one or more components or operations among the above-described corresponding components may be omitted, or one or more other components or operations may be added. Alternatively or additionally, a plurality of components (for example, module or program) may be integrated into a single component. In this case, the integrated component may perform one or more functions of each component of the plurality of components that are the same as or similar to that performed by the corresponding component among the plurality of components prior to the integration. According to various embodiments, operations performed by a module, a program, or other components may be executed sequentially, in parallel, repeatedly, or heuristically, or one or more of the operations may be executed in a different order or omitted, or one or more other operations may be added.

Although various flowcharts are disclosed to describe the embodiments of the present disclosure, this is for convenience of description of each operation, and each operation is not necessarily performed according to the order of the flowchart. That is, each operation in the flowchart may be performed simultaneously with each other, performed in an order according to the flowchart, or may be performed in an order opposite to the order in the flowchart.

Figure 2:
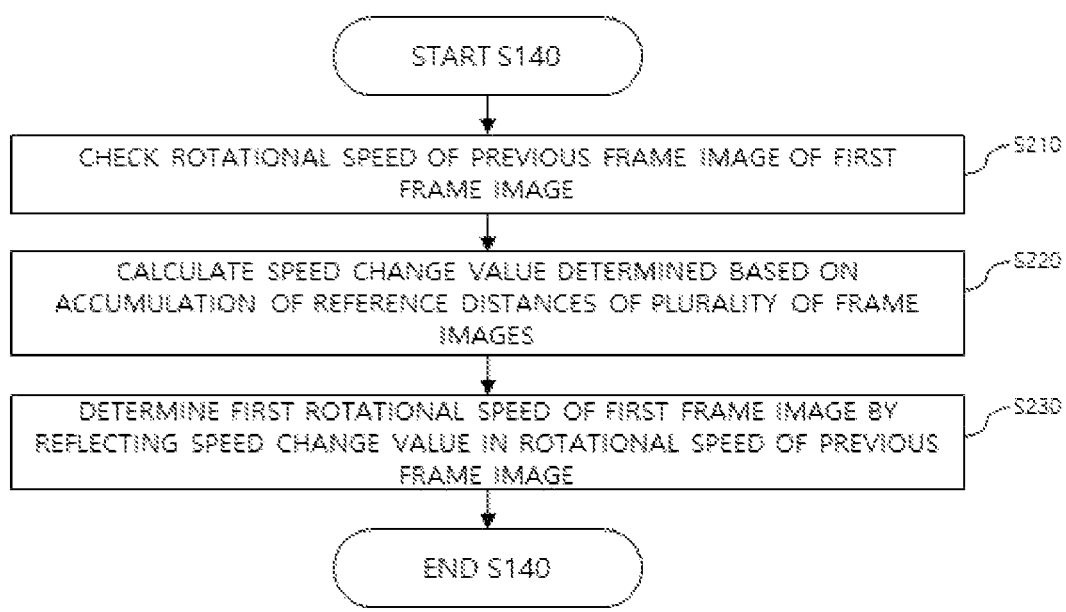
FIG. 2 is a diagram for describing a method of tracking an object according to an embodiment of an operation of calculating a rotational speed disclosed in FIG. 1.
Figure 3:
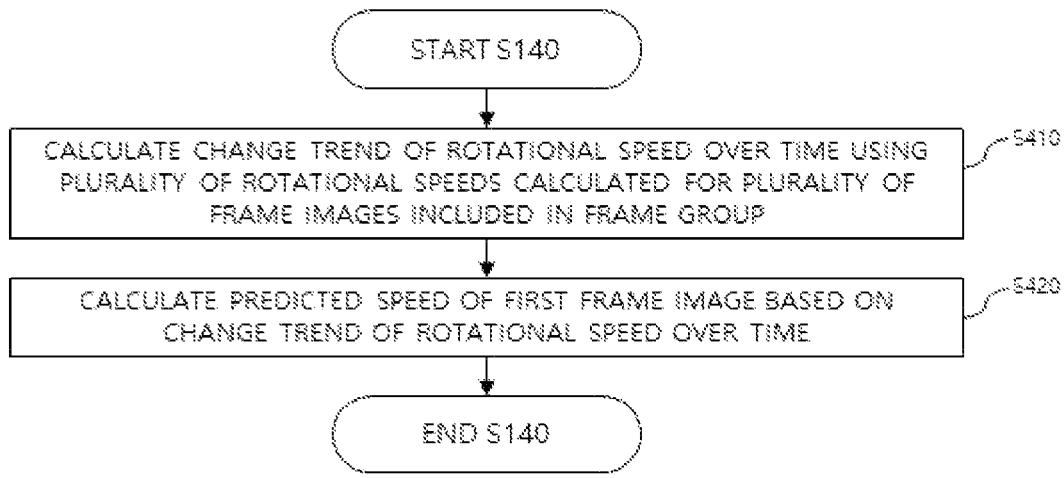
FIG. 3 is a diagram for describing a method of tracking an object according to an embodiment of an operation of determining a first rotational speed disclosed in FIG. 2.

FIG. 1 is a diagram for describing a method of tracking an object according to an embodiment disclosed in the present application, FIG. 2 is a diagram for describing a method of tracking an object according to an embodiment of an operation of calculating a rotational speed disclosed in FIG. 1, and FIG. 3 is a diagram for describing a method of tracking an object according to an embodiment of an operation of determining a first rotational speed disclosed in FIG. 2.

Referring to FIG. 1, the method of tracking an object performed in a portable terminal linked with a rotatable cradle so that a rotation of the rotatable cradle is controlled to track the object may include an operation S120 of detecting whether the object exists in a frame image, an operation S130 of calculating a reference distance, an operation S140 of calculating a rotational speed of the rotatable cradle for a first frame image, and an operation S150 of controlling driving of the rotatable cradle.

The operation S120 of detecting whether the object exists in the frame image may include an operation S110 of capturing frame images in a forward direction of the portable terminal at a preset frame rate.

The operation S110 of capturing the frame image may be an operation of capturing the frame image based on the preset number of detections when a motion of the object within the frame image is detected through the portable terminal. Here, the preset number of detections may be set according to the user's use and convenience. For example, when the user sets the frame rate to 20 detections per second, the portable terminal may capture frame images 20 times per second.

The operation S120 of detecting whether the object exists in the frame image may be an operation of receiving the captured frame image to detect whether the object exists within the frame image for each of the frame images when the motion of the object in the frame image for the front is detected and thus the frame image capturing starts at the preset frame rate in the operation S110 of capturing the frame image.

The operation S130 of calculating the reference distance may be an operation of calculating a reference distance in association with the position of the detected object in the frame image when the object is detected in the frame image for each of the frame images in the operation S120 of detecting whether the object exists in the frame image.

Here, the operation S130 of calculating the reference distance may include an operation (not illustrated) of calculating a difference between a preset reference position and the position of the detected object in the frame image as the reference distance.

The operation of calculating the difference between the preset reference position and the position of the detected object in the frame image as the reference distance may be an operation of calculating how much the position of the object on the captured frame image differs from the reference position when the motion of the object in the frame image is detected using the preset position of the frame image according to the user's use and convenience as the reference position.

For example, when the preset reference position in the frame image is a center of the frame image, and the object is detected in the operation S120 of detecting whether the object exists in the frame image, the detected object is to be positioned first at a center which is the preset reference position.

Thereafter, when a motion of an object is detected in a frame image, the portable terminal starts capturing a plurality of frame images based on the preset number of detections, and the portable terminal starts controlling the rotatable cradle so that the object may exist at the center of the frame image.

When an object existing in the frame image moves to the right from the preset reference position, that is, the center, with respect to the front, the portable terminal drives the rotatable cradle to the right with respect to the front, and conversely, when the object moves from the center of the frame image to the left, the portable terminal drives the rotatable cradle to the left with respect to the front.

In this way, a difference may occur between the position of the moved object and the preset reference position in a plurality of frame images captured while the object existing at the center of the frame image moves. The reference distance is calculated based on the difference between the positions.

In other words, when an object is detected, the object is positioned at the center of the frame image, and when the motion of the object is detected, a plurality of frame images may be captured per second. A difference in position on a frame image may occur between the frame image at the reference position and a next frame image captured by an object that starts moving, and the reference distance is calculated based on the difference.

However, since this is only one example for implementing the present invention, the difference between the preset reference position and the position of the detected object in the frame image may be calculated as a value in which weights are further reflected in addition to the reference distance.

The operation S140 of calculating the rotational speed of the rotatable cradle for the first frame image may be an operation of calculating the rotational speed of the rotatable cradle for the first frame image for driving the rotatable cradle based on an accumulation of reference distances of a plurality of frame images included in the frame group including the first frame image.

The first frame image may be a frame image that is any one of a plurality of frame images captured per second for a motion of an object detected by a portable terminal. Hereinafter, the first frame image, which is one of the plurality of frame images, will be described.

In this way, the rotational speed of the rotatable cradle for the first frame image may be calculated based on the accumulated value of the reference distances calculated in the operation S130 of calculating the reference distances for each of the plurality of frame images including the first frame image.

Referring to FIG. 2, the operation S140 of calculating the rotational speed of the rotatable cradle for the first frame image may include an operation S210 of checking a rotational speed of a previous frame image of the first frame image, an operation S220 of calculating a speed variation value determined based on an accumulation of reference distances of a plurality of frame images, and an operation S230 of determining a first rotational speed for the first frame image by reflecting the speed variation value to the rotational speed of the previous frame image.

The operation S210 of checking the rotational speed of the previous frame image of the first frame image may be an operation of checking the rotational speed using a difference between a preset reference position in the first frame image and a position of an object in the frame image.

In this case, when there is no previous frame image of the first frame image, the rotational speed may be checked in proportion to the reference distance, which is the difference between the preset reference position and the position of the object. That is, when there is the movement of the object in the frame image after the portable terminal recognizes the object in a forward direction and is positioned at the preset reference position, since there is no difference between the preset reference position and the position of the object in the frame image in the previous frame image of the first frame image captured before the object in the frame image moves, the rotational speed of the rotatable cradle according to the movement of the object later may be a rotational speed proportional to the reference distance of the first frame image captured for the first time.

The operation S220 of calculating the speed variation value determined based on the accumulation of reference distances of the plurality of frame images may be an operation of continuously capturing, by the portable terminal, the plurality of frame images when there is the movement of the object in the frame image, continuously calculating the reference distance, and calculating the speed variation value using the accumulation of the reference distances.

For example, the variation value of the rotational speed of the rotatable cradle for the first frame image may be calculated as a cumulative value of reference distances, which are the difference between the preset reference position and the position of the detected object, and the reference distance in the first frame image may be calculated with a first reference distance that is the difference between the preset reference position and the position of the detected object in the previous frame image of the first frame image, and a second reference distance that is the difference between the preset reference position and the position of the detected object in the first frame image.

In an embodiment, the variation value of the rotational speed may be calculated through the following Equation.

$$V_{rotational\ speed\ variation\ value} = a*K_i + b\ (K_i = \text{integral constant}, a \text{ and } b = \text{constant or variable})$$

In the above Equation, a is a variable calculated based on the accumulation of the reference distances of the plurality of frame images. $K_i$ is an integral constant that is a value determined according to a motor used when driving the rotatable cradle. b is a constant or a variable calculated based on the reference distances of the plurality of frame images according to the present invention.

The operation S230 of determining the first rotational speed for the first frame image by reflecting the speed variation value to the rotational speed of the previous frame image may be an operation of checking the increase or decrease in the rotational speed of the rotatable cradle using the reference distance between the first frame image and the previous frame image.

Referring to FIG. 3, the operation S230 of determining the first rotational speed for the first frame image by reflecting the speed variation value may include an operation S310 of checking the first reference distance in the previous frame image, an operation S320 of checking the second reference distance in the first frame image, an operation S330 of comparing the distance between the first reference distance and the second reference distance, an operation S332 of setting the speed variation value to a positive value when the second reference distance is longer than the first reference distance, and an operation S331 of setting the speed variation value to a negative value when the first reference distance is shorter.

The operation S310 of checking the first reference distance in the previous frame image may be an operation of checking the first reference distance using the difference between the preset reference position and the position of the detected object in the previous frame image of the first frame image. Similarly, the operation S320 of checking the second reference distance in the first frame image may be an operation of checking the second reference distance using the difference between the preset reference position and the position of the detected object in the first frame image.

For example, when the preset reference position is the center of the frame image according to the user's use and convenience and the object positioned at the center of the previous frame image of the first frame image moves 1 cm from the center of the reference position, 1 cm may be the first reference distance.

When the object positioned at the center of the reference position in the first frame image moves 2 cm from the center of the reference position, 2 cm may be the second reference distance in the first frame image.

Checking the first reference distance and the second reference distance is to determine whether the rotational speed of the rotatable cradle, which will be described later, increases or decreases as the object in the frame image moves according to the movement of the object in the frame image.

The operation S330 of comparing the distances of the first reference distance and the second reference distance may be an operation of determining a sign between the reference distances by comparing lengths of the first reference distance and the second reference distance.

The operation S322 of setting the speed variation value to the positive value when the second reference distance is longer than the first reference distance and the operation S331 of setting the speed variation value to the negative value when the first reference distance is shorter than the second reference distance may be an operation of determining whether the rotational speed of the rotatable cradle increases or decreases.

For example, as in the above embodiment, when the first reference distance is 1 cm and the second reference distance is 2 cm, the speed variation value may be set to the positive value because the first reference distance is shorter than the second reference distance.

Conversely, when the first reference distance is 2 cm and the second reference distance is 1 cm, the speed variation value may be set to the negative value because the second reference distance is longer than the first reference distance.

When the speed variation value is set to the positive value, the rotational speed of the rotatable cradle may increase, and when the speed variation value is set to the negative value, the rotational speed of the rotatable cradle may decrease.

Figure 4:
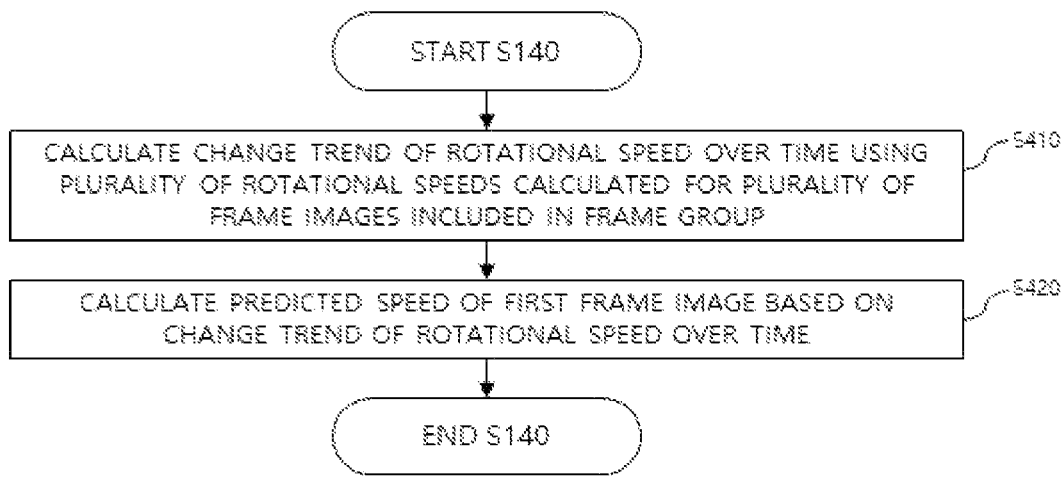
FIG. 4 is a diagram for describing a method of tracking an object according to another embodiment of an operation of calculating a rotational speed disclosed in FIG. 2.
Figure 5:
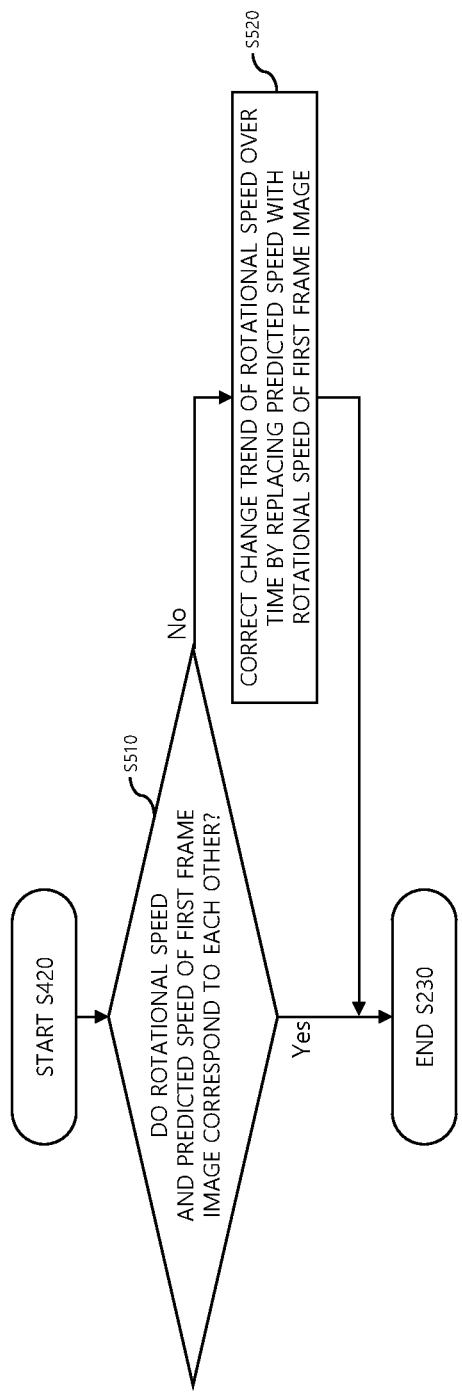
FIG. 5 is an exemplary diagram for describing an operation of correcting a predicted speed in the operation of calculating a predicted speed disclosed in FIG. 4.

FIG. 4 is a diagram for describing a method of tracking an object according to another embodiment of the operation of calculating the rotational speed disclosed in FIG. 2, and FIG. 5 is an exemplary diagram of describing an operation of correcting the predicted speed in the operation of calculating the predicted speed disclosed in FIG. 4.

Figure 6:
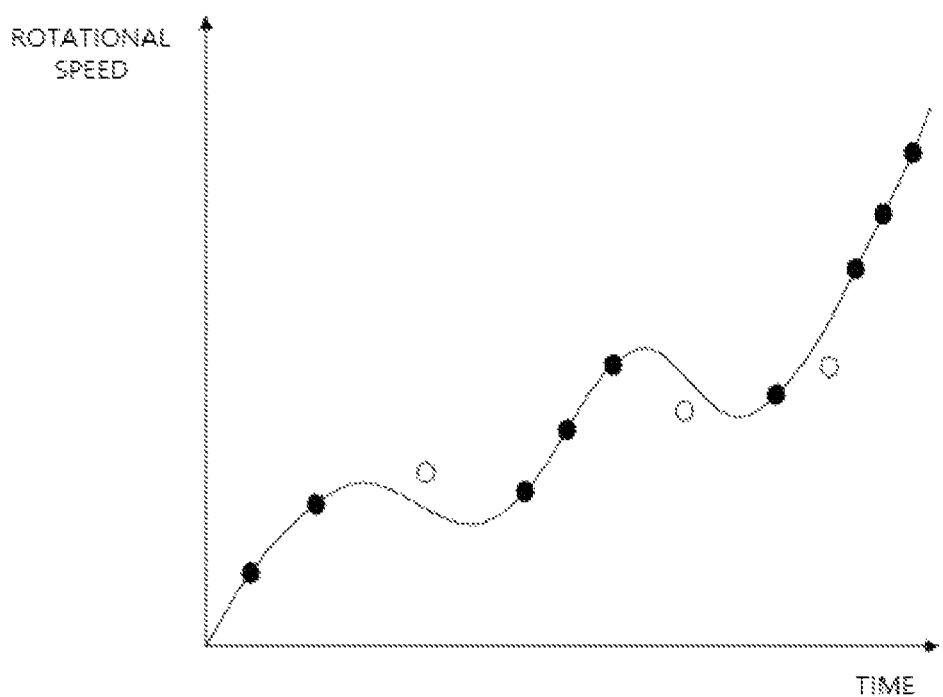
FIGS. 6 to 8 are exemplary diagrams for describing a process of correcting the predicted speed disclosed in FIG. 5.
Figure 7:
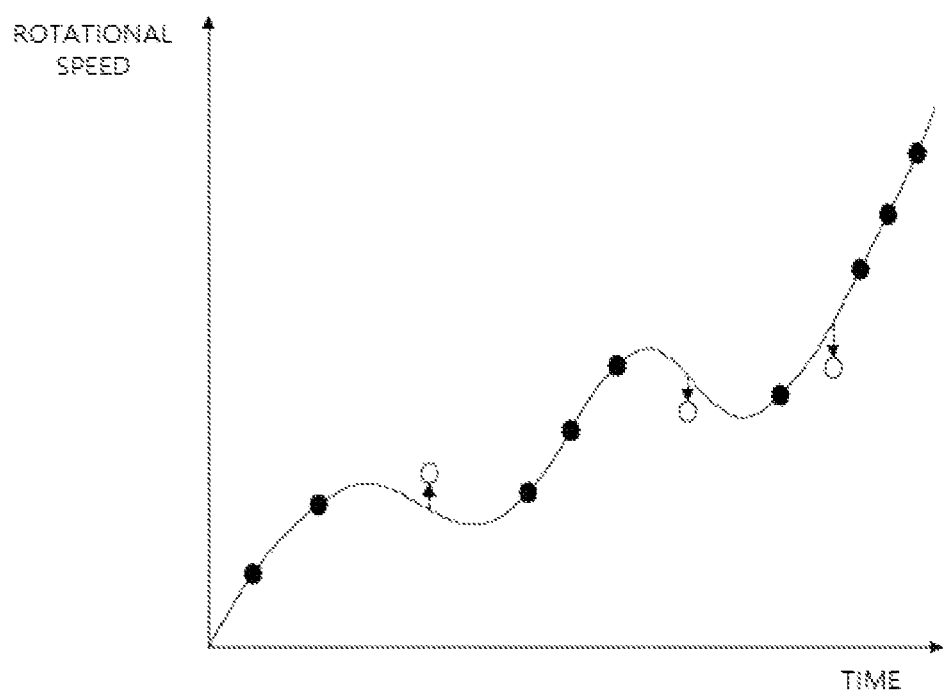
Figure 8:
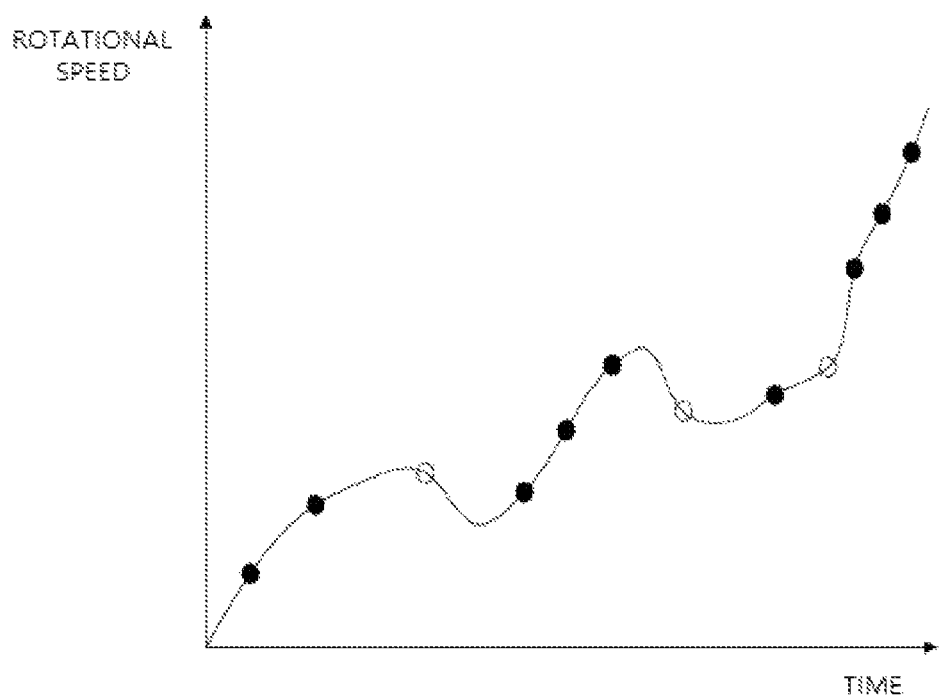

Further, FIGS. 6 to 8 are exemplary diagrams for describing a process of correcting the predicted speed disclosed in FIG. 5.

Referring to FIG. 4, the operation S140 of calculating the rotational speed of the rotatable cradle for the first frame image may further include an operation S410 of calculating the variation trend of the rotational speed over time and an operation S420 of calculating the predicted speed for the first frame image.

The operation S410 of calculating the variation trend of the rotational speed over time may be an operation of calculating the variation trend of the rotational speed over time using the plurality of rotational speeds calculated for the plurality of frame images included in the frame group and the position of the object in the previous frame image of the first frame image.

For example, when the object is detected in the first frame image, the variation trend over time may be calculated using the rotational speed of the rotatable cradle for the first frame image calculated based on the accumulation of reference distances of the plurality of frame images captured over time and the position of the object in the previous frame image of the first frame image as input values of the Kalman filter.

By using a continuously moving object, it is possible to derive the variation trend of the rotational speed over time corresponding to the frame image.

However, since this is only an example for describing the present application, probability measurement models capable of predicting the variation trend of the rotational speed based on the rotational speed, the position of the object, the reference distance or the like other than the Kalman filter may be used instead.

In addition, although the Kalman filter here is described by taking a linear Kalman filter as an example, it will be natural that the present application may be implemented in an extended Kalman filter as well without being limited to the linear Kalman filter.

The operation S420 of calculating the predicted speed for the first frame image may be an operation of calculating the predicted speed at the time when each frame image is positioned in the variation trends over time of a plurality of rotational speeds calculated by detecting objects and the rotational speed calculated based on the position of the object in the previous frame of the first frame image.

This is the variation trend over time derived using the probability measurement model using, as the input values, the rotational speed and the position of the object calculated when objects are detected in a plurality of frame images, so the predicted speed may be included in the predicted speed for rotating the rotatable cradle not only in the frame image in which the object is detected in the plurality of frame images, but also in the frame image in which the object is not detected in the plurality of frame images.

Calculating the predicted speed may be made by calculating the rotational speed of the rotatable cradle based on the accumulation of the reference distances when the object exists on the first frame image, but is to calculate, as the predicted speed, the rotational speed of the time when the frame image in which the object is not detected is positioned in the variation trend of the rotational speed over time is positioned when the object does not exist on the first frame image. A detailed description thereof will be given below.

Referring to FIG. 5, the operation S420 of calculating the predicted speed of the first frame image may include an operation S510 of determining whether the rotational speed and the predicted speed of the first frame image correspond to each other and an operation S520 of correcting the variation trend of the rotational speed.

The operation S510 of determining whether the rotational speed and the predicted speed of the first frame image correspond to each other may be an operation of determining whether the rotational speed of the rotatable cradle calculated by detecting the object on the first frame image and when the object is not detected on the first frame image, the predicted speed in the variation trend with respect to the time of the rotation speed calculated using the probability measurement model match each other or are within an error range.

The predicted speed has the advantage of predicting the speed with the rotational speed at the time when the first frame image in which the object is not detected is positioned in the variation trend of the rotational speed over time when the object is not detected on the first frame image, but since the predicted speed is the variation trend using the plurality of rotational speeds calculated in the plurality of frame images included in the frame group, the rotational speed calculated by detecting the real object in the first frame image and the predicted speed calculated based on the variation trend of the rotational speed over time may not correspond to each other.

Since the rotational speed calculated by detecting the real object in the first frame image and the predicted speed calculated based on the variation trend of the rotational speed over time needs to correspond to each other so that the rotatable cradle may smoothly track continuously moving objects without missing the moving objects, the present invention continuously compares and determines the rotational speed when the object is detected and the predicted speed in the variation trend of the rotational speed over time so that the rotational speed and the predicted speed corresponds to each other.

In addition, according to the present invention, when the actual rotational speed and the predicted speed do not correspond to each other, the predicted speed may be matched with the rotational speed or corresponded to the rotational speed to exist within an error range. This will be described in the operation S520 of correcting the variation trend of the rotational speed over time.

The operation S520 of correcting the variation trend of the rotational speed may be an operation of accurately calculating the variation trend of the rotational speed by correcting the predicted speed in the variation trend of the rotational speed over time to the rotational speed for the first frame image in which the object is detected when the rotational speed and the predicted speed for the first frame image do not correspond to each other.

According to the present invention, even when an object is not detected in a frame image, when an object is detected in the frame image, the rotatable cradle may be controlled by using the predicted speed as the rotational speed of the rotatable cradle in the variation trend of the rotational speed over time calculated based on the rotational speed, and the predicted speed is replaced with the rotational speed when the actual rotational speed does not correspond the predicted speed in the variation trend of the rotational speed over time, so there is the advantage of minimizing the error range between the variation trend of the rotational speed over time and the actual rotational speed.

Describing FIGS. 6 to 8 as an example, FIG. 6 is a graph showing the variation trend of the rotational speed over time, and a solid line shown in the graph may show a set of values calculated using the plurality of rotational speeds calculated for the plurality of frame images included in the frame group including the first frame image and the position of the object in the previous frame image of the first frame image.

Also, a solid dot may be an actual rotational speed calculated by detecting the object in the first frame image.

Referring to FIG. 7, it can be seen that the variation trends of rotational speed and the rotational speed over time are mostly the same, but the variation trends of rotational speed and the predicted speed over time may be different. In this way, when the variation trends of the rotational speed and the predicted speed over time are different, the predicted speed is replaced with the rotational speed so that the incorrectly predicted speed may match the actual rotational speed, so the variation trend graph may be corrected as illustrated in FIG. 8.

Figure 9:
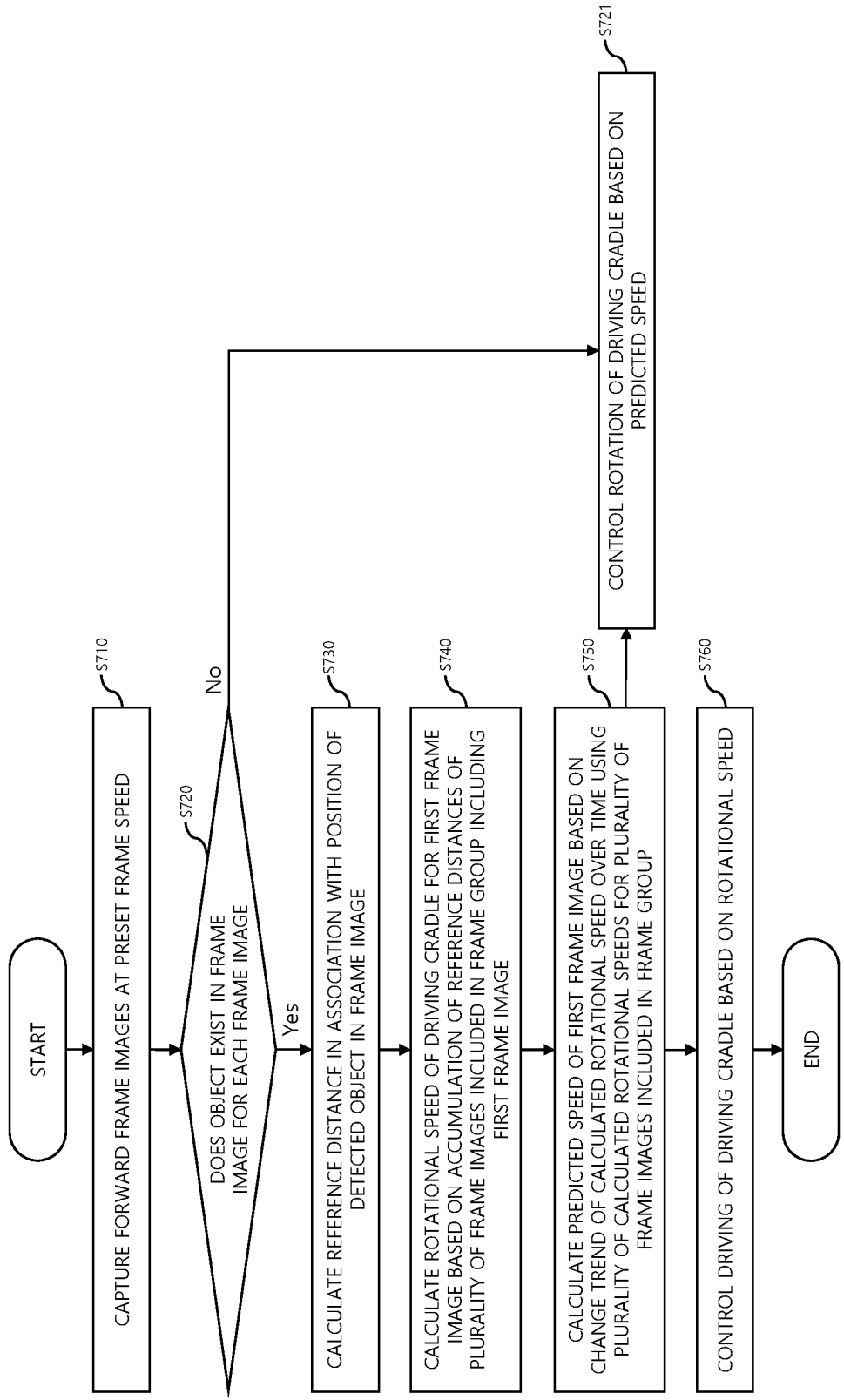
FIG. 9 is a diagram for describing a method of tracking an object according to another exemplary embodiment disclosed in the present application.

FIG. 9 is a diagram for describing a method of tracking an object according to another exemplary embodiment disclosed in the present application.

Referring to FIG. 9, the method of tracking an object may include an operation S710 of capturing a frame image at a preset frame rate, an operation S720 of detecting whether the object exists in the frame image, an operation S730 of calculating a reference distance in association with the position of the detected object in the frame image when the object is detected, an operation S740 of calculating a rotational speed of a rotatable cradle for the first frame image, an operation S750 of calculating a predicted speed for the first frame image, and an operation S760 of controlling driving of the rotatable cradle.

In addition, when the object is not detected, the method of tracking an object may further include an operation S721 of controlling a rotation of the rotatable cradle based on the calculated predicted speed.

Here, descriptions of operations identical to those of the method of tracking an object described in FIGS. 1 to 4 will be omitted below.

When the object is not detected, the operation S721 of controlling the rotation of the rotatable cradle based on the calculated predicted speed may be an operation of setting the predicted speed for the first frame image as the rotational speed for the first frame image based on the variation trend over time of the rotational speed calculated based on the plurality of rotational speeds calculated for the plurality of frame images included in the frame group when the rotational speed of the rotatable cradle may not be calculated because the object is not detected in the first frame image.

As described above, the rotational speed of the rotatable cradle may be calculated based on an accumulation of reference distances calculated by preset reference positions and positions of objects of a plurality of frame images, and as a result, the rotatable cradle may track the object.

However, there may be a case where an object is not detected on a plurality of frame images. In this case, by using the variation trend of the rotational speed over time calculated in the operation S410 of calculating the trend of change of the rotational speed over time, the predicted speed for the position of the frame image in which the object is not detected may be set as the rotational speed of the rotatable cradle for the first frame image.

The rotational speed may be the rotational speed of the rotatable cradle calculated based on the accumulation of the reference distances when the object is detected in the first frame image, and the predicted speed may be a speed predicted based on the variation trend of the rotational speed over time calculated based on a plurality of rotational speeds calculated by detecting objects. Furthermore, when the object is not detected in the first frame image, the predicted speed at the time when the frame image in which the object is not detected is positioned in the variation trend over time may be set as the rotational speed.

Referring to FIGS. 1 and 9, the operations S150 and S760 of controlling the driving of the rotatable cradle based on the rotational speed may be an operation of controlling the driving using the rotational speed when the object is detected in the first frame image and using, as the rotational speed of the rotatable cradle, the predicted speed replaced with the rotational speed when the object is not detected.

Figure 10:
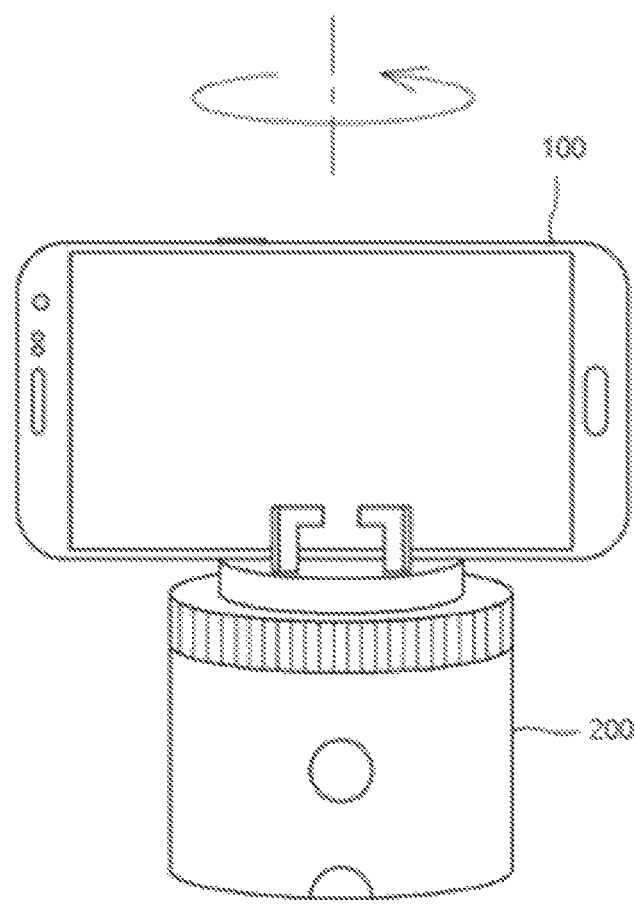
FIG. 10 is an exemplary diagram for describing a system for tracking an object according to an embodiment disclosed in the present application.
Figure 11:
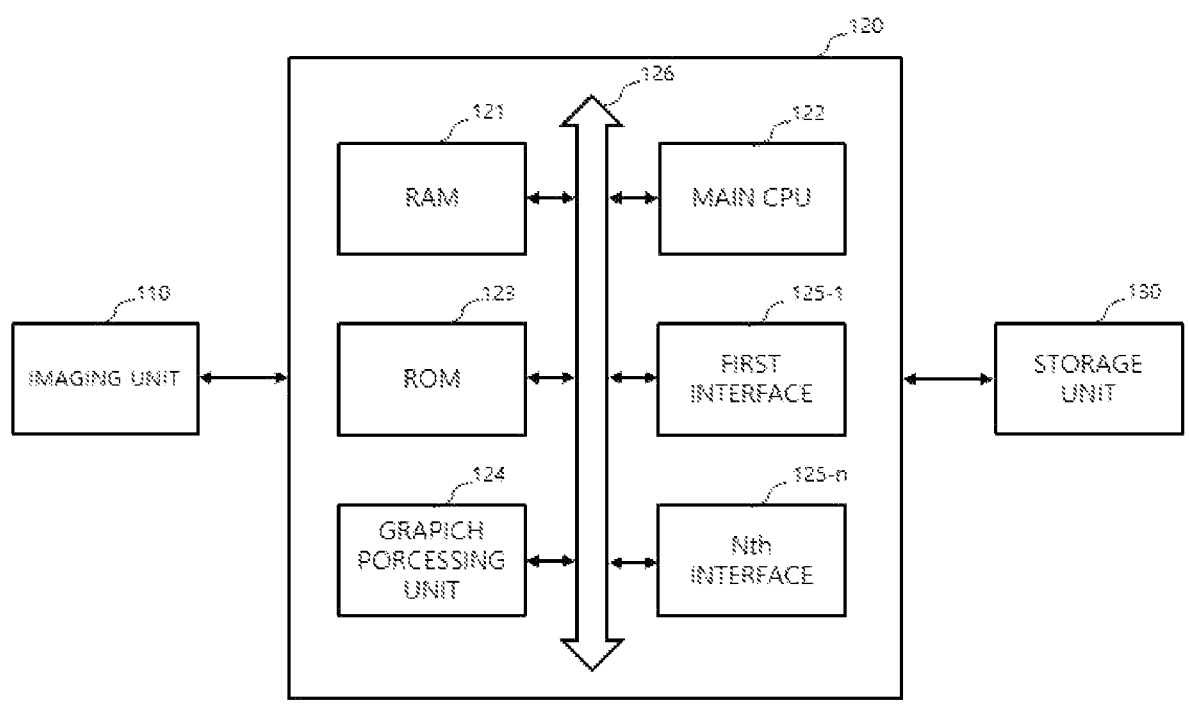
FIG. 11 is an exemplary diagram for describing a configuration according to a portable terminal of FIG. 10.

FIG. 10 is an exemplary diagram for describing a system for tracking an object according to an embodiment disclosed in the present application, and FIG. 11 is an exemplary diagram for describing a configuration according to a portable terminal of FIG. 10.

Referring to FIG. 10, a system 10 for tracking an object may include a rotatable cradle 200 and a portable terminal 100.

The rotatable cradle 200 may be mounted on the portable terminal 100 and perform a rotational driving operation according to a rotational speed provided from the portable terminal 100.

For the rotational driving operation of the rotatable cradle 200, for example, the rotatable cradle 200 may include a rotating part and a body part.

The rotating part is a place where the portable terminal 100 is mounted, and may have a rotatable configuration so that the portable terminal 100 may track a moving object.

The body part may include a motor or the like to rotate the rotating part, and may receive the rotational speed provided from the portable terminal 100 to rotate the rotating part.

The portable terminal 100 may control the rotatable cradle 200 so that the front of the portable terminal 100 tracks the object based on the position of the object in the frame image.

Here, the portable terminal 100 is an electronic device that can be used to access a server, and includes, for example, a portable electronic device, and may include, for example, a mobile phone, a smart phone, a laptop computer, a digital broadcasting terminal, personal digital assistants (PDA), a portable multimedia player (PMP), navigation, a personal computer (PC), a tablet PC, an ultrabook, a wearable device (for example, a watch-type terminal (smartwatch), a glass-type terminal (smart glass), a head mounted display (HMD)), etc. However, in addition to this, the portable terminal 100 may include electronic devices used for virtual reality (VR) and augmented reality (AR).

Referring to FIG. 11, the portable terminal 100 may include an imaging unit 110, a processor 120, and a storage unit 130.

The imaging unit 110 may take frame images in a forward direction at a preset frame rate, and the imaging unit 110 may be a sensor such as a camera that can perform capturing.

For each frame image, the processor 120 may detect whether an object exists in the corresponding frame image, and determine the rotational speed of the rotatable cradle 200 based on the position of the detected object.

In the processor 120, a RAM 121, a ROM 123, a main CPU 122, a graphic processing unit 124, first to nth interfaces 125-1 to 125-n, and the like may be connected to each other through a bus 126.

The first to nth interfaces 125-1 to 125-n are connected to various components to be described below. The interfaces may be connected to each other through a network.

The first to nth interfaces 125-1 to 125-n are connected to various components described above. One of the interfaces may be a network interface connected to an external device through the network.

The main CPU 122 accesses the storage unit 130 to perform booting using an operating system (O/S) stored in the storage unit 130. In addition, the main CPU 122 performs various operations using various programs, contents, data, and the like, stored in the storage unit 130.

In particular, the main CPU 122 may receive frame images captured in a forward direction at a preset frame rate when a user operation for activating object tracking is input to detect whether an object exists in a frame image for each frame image, calculate a reference distance in association with the position of the detected object in the frame image for each frame image when the object is detected in the frame image, calculate a rotational speed of a rotatable cradle for a first frame image based on an accumulation of reference distances of a plurality of frame images included in a frame group including the first frame image, and activate the driving of the rotatable cradle based on the rotational speed.

An instruction set for booting a system, or the like, is stored in the ROM 123. When a turn-on command is input to supply power to the main CPU 122, the main CPU 122 copies an O/S stored in the storage unit 170 to the RAM 121 depending on an instruction stored in the ROM 123, and execute the O/S to boot the system. When the booting is completed, the main CPU 122 copies various application programs stored in the storage unit 130 to the RAM 121, and executes the application programs copied to the RAM 121 to perform various operations.

The graphic processing unit 124 renders a screen including various objects, such as an icon, an image, and a text, using a calculator (not illustrated) and a renderer (not illustrated). The calculator (not illustrated) calculates attribute values, such as coordinate values at which each object will be displayed and forms, sizes, and colors of each object, according to a layout of the screen based on the received control command. The renderer (not illustrated) renders screens of various layouts including objects on the basis of the attribute values calculated in the calculator (not illustrated).

In particular, the graphic processing unit 124 may implement objects generated by the main CPU 122 as a graphic user interface (GUI), an icon, a user interface screen, and the like.

Meanwhile, the operation of the processor 120 described above may be performed by a program stored in the storage unit 130.

The storage unit 130 stores various data such as an O/S software module for driving the rotatable cradle 200, various multimedia contents.

In addition, the processor 120 may include a software module that receives the frame images captured in a forward direction at the preset frame rate when the user operation for activating object tracking is input to detect whether the object exists in the frame image for each frame image, calculates the reference distance in association with the position of the detected object in the frame image for each frame image when the object is detected in the frame image, calculates the rotational speed of the rotatable cradle for the first frame image based on the accumulation of the reference distances of the plurality of frame images included in the frame group including the first frame image, and activates the driving of the rotatable cradle based on the rotational speed.

Figure 12:
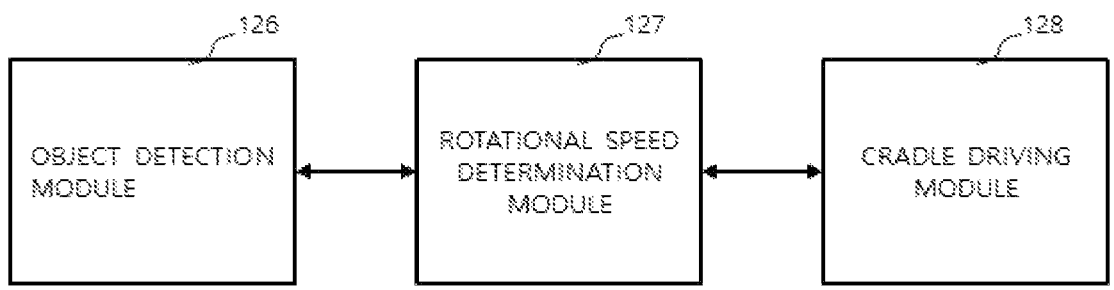
FIG. 12 is an exemplary diagram for describing a configuration of a processor disclosed in FIG. 11 according to another embodiment.
Figure 13:
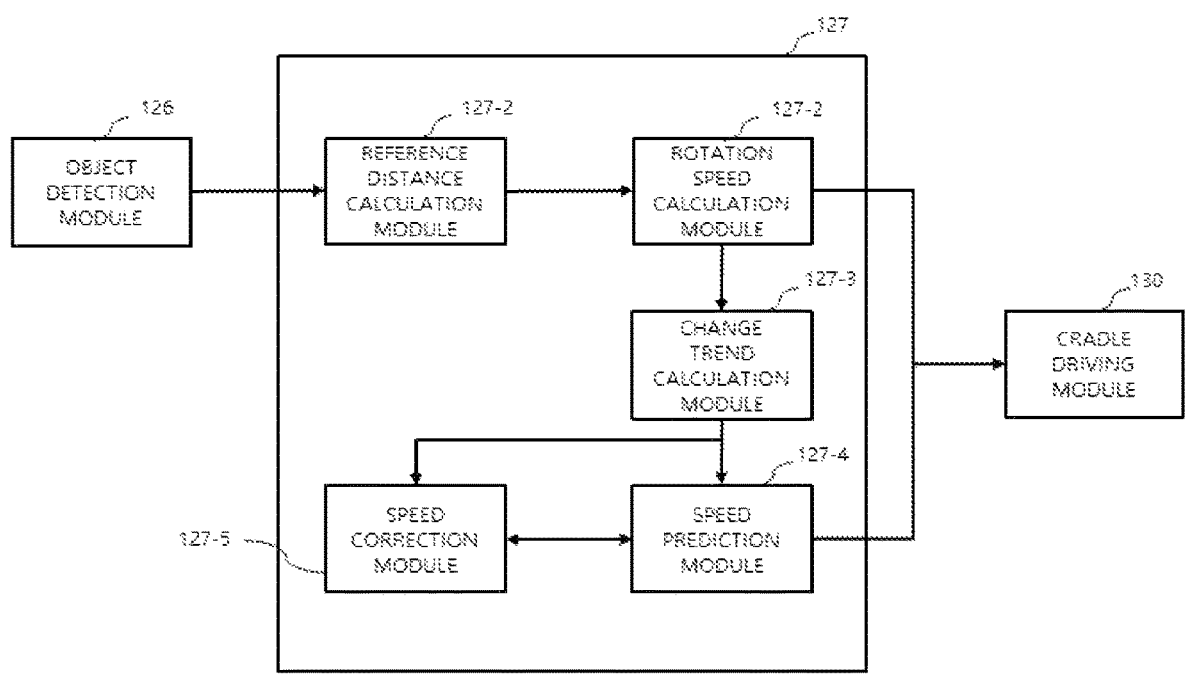
FIG. 13 is an exemplary diagram for explaining a configuration of a rotational speed determination module of FIG. 12 according to an embodiment.

FIG. 12 is an exemplary diagram for describing a configuration of a processor disclosed in FIG. 11 according to another embodiment and FIG. 13 is an exemplary diagram for explaining a configuration of a rotational speed determination module of FIG. 12 according to an embodiment.

Referring to FIG. 12, the processor 120 may include an object detection module 126, a rotational speed determination module 127, and a cradle rotatable module 128.

The object detection module 126 may receive the frame images captured by the imaging unit 110 to detect whether an object exists in the frame image for each frame image.

The object detection module 126 may detect whether the object exists in the frame image while capturing the frame image based on the preset number of detections when the motion of the object is detected in the frame image through the portable terminal.

When the object is detected in the frame image by the object detection module 126, the rotational speed determination module 127 may determine the rotational speed based on the reference distance calculated in association with the position of the detected object.

Referring to FIG. 13, the rotational speed determination module 127 may include a reference distance calculation module 127-1 and a rotational speed calculation module 127-2.

When the object is detected in the frame image, the reference distance calculation module 127-1 may calculate the reference distance in association with the position of the detected object in the frame image.

In other words, the reference distance is calculated based on the difference between the position of the detected object in the frame image for each frame image in which the object exists and the preset reference position in the frame image.

For example, assuming that the preset reference position is the center of the frame image, when an object is detected, the object is positioned at the center of the frame image, and a plurality of frame images may be captured per second as the motion of the object is detected. Then, when a difference between the reference position on the frame image and the position of the object may occur between the frame image at the reference position and a next frame image of the captured object that starts moving, the reference distance may be calculated based on the difference.

The rotational speed calculation module 127-2 may calculate the rotational speed of the rotatable cradle for the first frame image based on the accumulation of the reference distances of the plurality of frame images included in the frame group including the first frame image.

It has been described above that the first frame image may be any one of the frame images that start capturing the plurality of motions of the object detected through the portable terminal per second.

In this way, the rotational speed of the rotatable cradle for the first frame image may be calculated based on the accumulated values of reference distances calculated for each of the plurality of frame images including the first frame image.

In another embodiment of the present invention, the rotational speed calculation module 127-2 may check the rotational speed using the difference between the preset reference position in the first frame image and the position of the object in the frame image.

Checking the rotational speed is that when there is the movement of the object in the frame image, the portable terminal 100 continues to capture the plurality of frame images, and the reference distance is also continuously calculated, and the speed variation value using the accumulation of these reference distances may be calculated.

For example, the variation value of the rotational speed of the rotatable cradle for the first frame image may be calculated as a cumulative value of reference distances, which are the difference between the preset reference position and the position of the detected object, and the reference distance in the first frame image may be calculated with a first reference distance that is the difference between the preset reference position and the position of the detected object in the previous frame image of the first frame image, and a second reference distance that is the difference between the preset reference position and the position of the detected object in the first frame image.

Checking the rotational speed in the rotational speed calculation module 127-2 not only may include calculating the speed variation value, but also checking the increase or decrease in the rotational speed of the rotatable cradle using the reference distance between the first frame image and the previous frame image.

For example, in the description based on the first reference distance and the second reference distance described above, first, the first reference distance in the previous frame image is checked, and the second reference distance in the first frame image is checked. When the first reference distance is longer than the second reference distance, the speed variation value may be set to a positive value, and conversely, when the first reference distance is shorter than the second reference distance, the speed variation value may be set to a negative value.

When the first reference distance is longer than the second reference distance and thus the speed variation value is set to a positive value, the rotational speed of the rotatable cradle may increase, and when the first reference distance is shorter than the second reference distance and thus the speed variation value is set to a negative value, the rotational speed of the rotatable cradle may decrease.

Continuing to refer to FIG. 13, the rotational speed determination module 127 may further include a variation trend calculation module 127-3, a speed estimation module 127-4, and a speed correction module 127-5.

The variation trend calculation module 127-3 may calculate a variation trend of the rotational speed over time using a plurality of rotational speeds calculated for a plurality of frame images included in the frame group.

For example, the variation trend of the rotational speed over time may be calculated using a plurality of rotational speeds calculated for a plurality of frame images included in a group and a position of an object in the previous frame image of the first frame image.

When an object is detected in the first frame image, the reference distances of the plurality of frame images captured over time are accumulated, and by using the rotational speed of the rotatable cradle for the first frame image calculated based on the accumulated reference distances and the position of object in the previous frame of the first frame image as the input values of the probability measurement model such as the Kalman filter, the variation trend over time may be calculated.

The speed prediction module 127-4 may calculate the predicted speed for the first frame image based on the variation trend of the rotational speed over time.

For example, the speed predicted at the time when each of the plurality of frame images is positioned in the variation trend over time of the plurality of rotational speeds calculated by detecting objects and the rotational speed calculated based on the position of object in the previous frame of the first frame image is calculated.

Calculating the predicted speed is for calculating the rotational speed of the rotatable cradle not only when the object exists on the first frame image, but also when the rotational speed may not be calculated because the object does not exist on the first frame image.

However, since the predicted speed is the variation trend over time derived using the probability measurement model using the rotational speed and the position of the object calculated when the objects are detected in the plurality of frame images as the input values, the predicted speed may correspond to the rotational speed calculated when the real object is detected, but there may be the case where the rotational speed calculated when the real object is detected does not correspond to the predicted speed in the variation trend over time.

In the present invention, when the predicted speed and the actual rotational speed do not correspond to each other, this may be corrected through the speed correction module 127-5 so that the predicted speed may match the actual rotational speed or may be located within the error range.

The speed correction module 127-5 may compare the rotational speed of the first frame image calculated by the rotational speed calculation module 127-2 and the predicted speed calculated by the speed prediction module 127-4 to correct the variation trend of the rotational speed over time.

By comparing whether the rotational speed and the predicted speed of the first frame image correspond to each other, and when the rotational speed and the predicted speed do not correspond to each other, the predicted speed is replaced with the rotational speed of the first frame image in which the object is detected and is corrected, so the variation trend of the rotational speed may be accurately calculated. When the rotational speed and the predicted speed of the first frame image correspond to each other, the predicted speed in the variation trend of the rotational speed may be the rotational speed of the first frame image in which the object is detected.

The speed correction module 127-5 may correct the predicted speed calculated by the speed prediction module 127-4 to the first frame image when the rotational speed of the rotatable cradle may not be calculated because the object is not detected in the first frame image.

As described above, the rotational speed of the rotatable cradle may be calculated based on an accumulation of reference distances calculated by preset reference positions and positions of objects of a plurality of frame images, and as a result, the rotatable cradle may track the object.

However, since the rotational speed is a speed that may be calculated when the object is detected in the first frame image, when the object is not detected in the first frame image, the predicted speed in the speed prediction module 127-4 is corrected to the rotational speed of the rotatable cradle for the first frame image, thereby preventing the tracking of the rotatable cradle from being interrupted.

The cradle rotatable module 128 may control the rotatable cradle 200 based on the rotational speed calculated by the rotational speed determination module 127.

The present application has one or more of the following effects:

According to an embodiment disclosed in the present application, it is possible to easily controlling a rotational speed of a rotatable cradle according to the movement of an object recognized by a portable terminal.

According to an embodiment disclosed in the present application, it is possible to calculate a rotational speed of a rotatable cradle by recognizing an object in a portable terminal and predict the rotational speed of the rotatable cradle in real time based on a calculated cumulative value of the rotational speed.

According to an embodiment disclosed in the present application, it is possible to calculate a rotational speed matching a moving speed of an omitted object based on a predicted rotational speed in real time even when the rotational speed of the rotatable cradle cannot be calculated because the portable terminal does not recognize the object.

The effects of the present disclosure are not limited to the above-described effects. That is, other effects that are not described may be obviously understood by those skilled in the art from the claims.

The present disclosure described above is not limited by the above-described embodiments and the accompanying drawings, but is limited by the claims described below, and it can be readily understood by those skilled in the art that the configuration of the present disclosure may variously be changed and modified within the scope without departing from the technical spirit of the present disclosure.

[Acknowledgement]

The present invention was filed overseas with the support of the following research projects supported by the Korean government.

Research Project Information
  Department Name: Korea Tourism Organization
  Research Project Name: Follow-up support for leading global tourism company
  Project Name: Smart phone-linked automatic person/object recognition and tracking device
  Organizer: 3i Corporation
  Research Period: Mar. 4, 2022 to Dec. 31, 2022

What is claimed is:

1. A method of tracking an object performed in a portable terminal linked with a rotatable cradle so that a rotation of the rotatable cradle is controlled to track the object, the method comprising:
   receiving frame images captured in a forward direction at a preset frame rate, and detecting whether an object exists in the frame image for each of the frame images;
   when the object is detected in the frame image for each of the frame images, calculating a reference distance in association with a position of the detected object in the frame image;
   calculating a rotational speed of the rotatable cradle for a first frame image based on an accumulation of reference distances of a plurality of frame images included in a frame group including the first frame image; and
   controlling driving of the rotatable cradle based on the rotational speed,
   wherein the calculating of the rotational speed of the rotatable cradle for the first frame image includes:
   calculating a variation trend of rotational speed over time using a plurality of rotational speeds calculated for the plurality of frame images included in the frame group; and
   calculating a predicted speed of the first frame image based on the variation trend of the rotational speed over time,
   wherein the calculating of the predicted speed of the first frame image includes:
   determining whether the rotational speed and the predicted speed of the first frame image correspond to each other; and
   when the rotational speed and the predicted speed of the first frame image do not correspond to each other, correcting the variation trend of the rotational speed over time by replacing the predicted speed with the rotational speed of the first frame image.

2. The method of claim 1, wherein the calculating of the reference distance includes calculating a difference between a preset reference position and the position of the detected object in the frame image as the reference distance.

3. The method of claim 1, wherein the calculating of the rotational speed of the rotatable cradle for the first frame image includes:
   checking a rotational speed of a previous frame image of the first frame image;
   calculating a speed variation factor determined based on the accumulation of the reference distances of the plurality of frame images; and
   determining a first rotational speed of the first frame image by reflecting the speed variation factor to the rotational speed of the previous frame image.

4. The method of claim 3, wherein the determining of the first rotational speed of the first frame image by reflecting the speed variation factor includes:
   checking a first reference distance in the previous frame image;
   checking a second reference distance in the first frame image;
   setting the speed variation factor to a positive value when the second reference distance is longer than the first reference distance; and
   setting the speed variation factor to a negative value when the second reference distance is shorter than the first reference distance.

5. The method of claim 1, further comprising controlling the rotatable cradle to rotate based on the predicted speed when the object is not detected in the frame image.

6. The method of claim 1, further comprising controlling the rotatable cradle to rotate based on the rotational speed of the first frame image when the object is detected in the first frame image.

7. A system for tracking an object, comprising:
   a rotatable cradle provided with a portable terminal mounted thereon and configured to rotate according to a rotational speed provided from the portable terminal; and
   the portable terminal configured to control the rotatable cradle based on a position of the object in a frame image so that a front of the portable terminal tracks the object;
   wherein the portable terminal includes:
   an imaging unit configured to capture frame images in a forward direction at a preset frame rate; and
   a processor, configured to detect whether the object exists in a corresponding frame image for each of the frame images and determining a rotational speed of the rotatable cradle based on the position of the detected object, including:
   a rotational speed determination module configured to determine the rotational speed in association with the position of the detected object when the object is detected in the frame image,
   wherein the rotational speed determination module includes:
   a rotational speed calculation module configured to calculate a rotational speed of the rotatable cradle for a first frame image based on an accumulation of reference distances of a plurality of frame images included in a frame group including the first frame image;
   a variation trend calculation module configured to calculate a variation trend of rotational speed over time using a plurality of rotational speeds calculated for the plurality of frame images included in the frame group;
   a speed prediction module configured to calculate a predicted speed of the first frame image based on the variation trend of the rotational speed over time; and
   a speed correction module configured to determine whether the rotational speed of the first frame image calculated by the rotational speed calculation module and the predicted speed calculated by the speed prediction module correspond to each other, and drives the rotatable cradle based on the rotational speed when the rotational speed and the predicted speed of the first frame image correspond to each other.

8. The system of claim 7, wherein the processor further includes:
   an object detection module configured to receive the frame images captured by the imaging unit and detect whether the object exists in the frame image for each of the frame images; and
   a cradle rotatable module configured to drive the rotatable cradle based on the rotational speed.

9. The system of claim 8, wherein the rotational speed determination module further includes:
   a reference distance calculation module configured to calculate a reference distance in association with the position of the detected object in the frame image when the object is detected in the frame image.

10. The system of claim 9, wherein
   the speed correction module is further configured to correct the variation trend of the rotational speed over time by comparing the rotational speed of the first frame image calculated by the rotational speed calculation module and the predicted speed calculated by the speed prediction module.

11. A system for tracking an object, comprising:
   a rotatable cradle provided with a portable terminal mounted thereon and configured to rotate according to a rotational speed provided from the portable terminal; and
   the portable terminal configured to control the rotatable cradle based on a position of the object in a frame image so that a front of the portable terminal tracks the object;
   wherein the portable terminal includes:
   an imaging unit configured to capture frame images in a forward direction at a preset frame rate; and
   a processor, configured to detect whether the object exists in a corresponding frame image for each of the frame images and determining a rotational speed of the rotatable cradle based on the position of the detected object, including:
   a rotational speed determination module configured to determine the rotational speed in association with the position of the detected object when the object is detected in the frame image,
   wherein the rotational speed determination module includes:
   a rotational speed calculation module configured to calculate a rotational speed of the rotatable cradle for a first frame image based on an accumulation of reference distances of a plurality of frame images included in a frame group including the first frame image;
   a variation trend calculation module configured to calculate a variation trend of rotational speed over time using a plurality of rotational speeds calculated for the plurality of frame images included in the frame group;
   a speed prediction module configured to calculate a predicted speed of the first frame image based on the variation trend of the rotational speed over time; and
   a rotational speed determination module configured to determine whether the rotational speed of the first frame image calculated by the rotational speed calculation module and the predicted speed calculated by the speed prediction module correspond to each other, and when the rotational speed and the predicted speed of the first frame image do not correspond to each other, replaces the predicted speed with the rotational speed corresponding to the first frame image to correct the variation trend of the rotational speed over time and drive the rotatable cradle at the replaced rotational speed.

12. The system of claim 10, wherein the rotational speed correction module determines the rotational speed of the rotatable cradle that the predicted speed calculated by the speed prediction module is the rotational speed of the first frame image when the object is not detected by the object detection module.

13. A storage medium in which computer-readable instructions are stored, comprising:
   when executed by a computing device, the instructions may allow a computing device to execute the operation of receiving frame images captured in a forward direction at a preset frame rate, and detecting whether an object exists in the frame image for each of the frame images;
   when the object is detected in the frame image, calculating a reference distance in association with a position of the detected object in the frame image for each of the frame images;
   calculating a rotational speed of a rotatable cradle for a first frame image based on an accumulation of reference distances of a plurality of frame images included in a frame group including the first frame image;
   controlling driving of the rotatable cradle based on the rotational speed,
   wherein the calculating of the rotational speed of the rotatable cradle for the first frame image includes:
   calculating a variation trend of rotational speed over time using a plurality of rotational speeds calculated for the plurality of frame images included in the frame group; and
   calculating a predicted speed of the first frame image based on the variation trend of the rotational speed over time,
   wherein the calculating of the predicted speed of the first frame image includes:
   determining whether the rotational speed and the predicted speed of the first frame image correspond to each other; and
   when the rotational speed and the predicted speed of the first frame image do not correspond to each other, correcting the variation trend of the rotational speed over time by replacing the predicted speed with the rotational speed of the first frame image.

* * * * *